A. W. EKSTROM.
PROCESS OF MANUFACTURING BARIUM AND STRONTIUM COMPOUNDS.
APPLICATION FILED AUG. 7, 1911.
1,067,595.
Patented July 15, 1913.
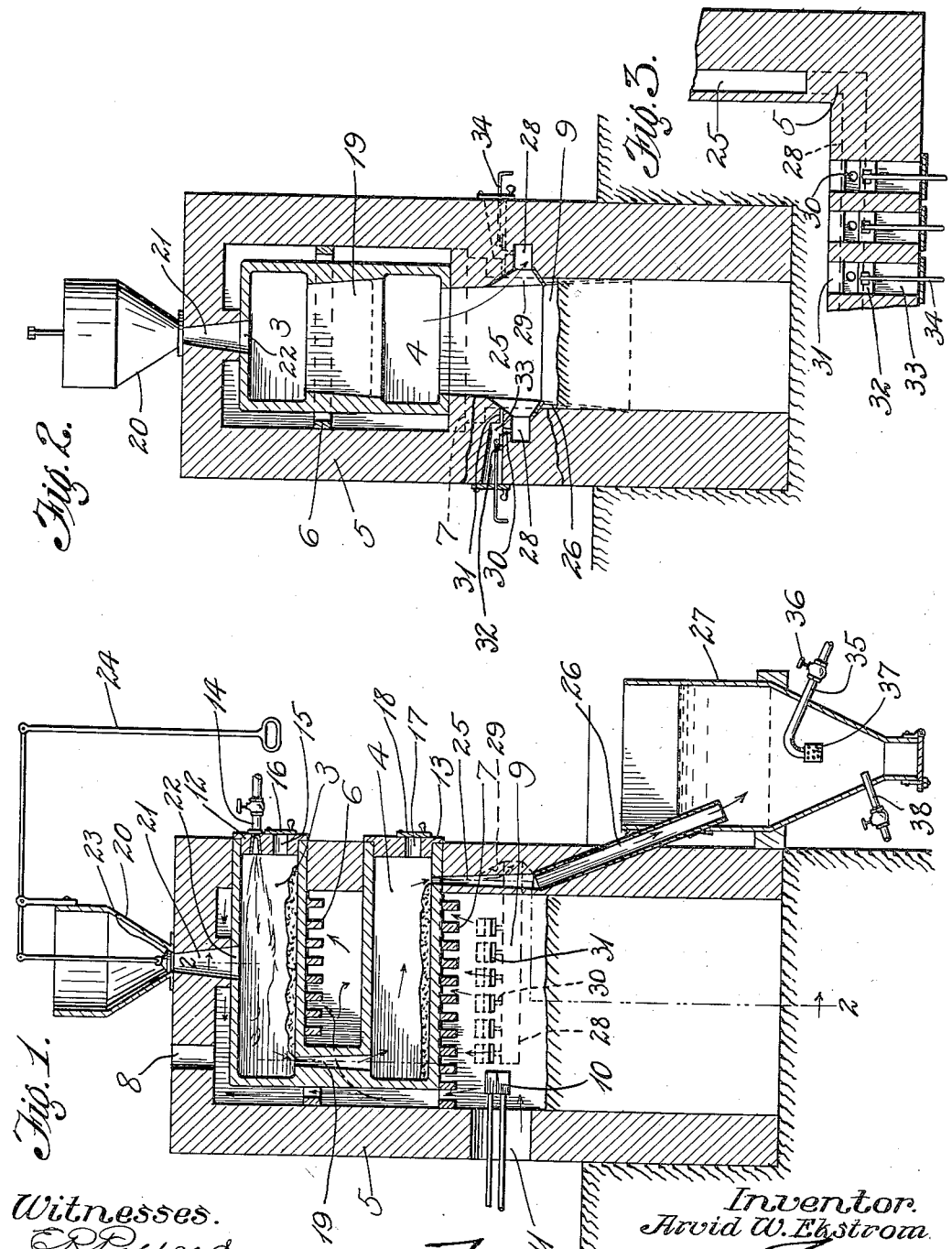
Witnesses.
Inventor.
Arvid W. Ekstrom
by Hazard & Strauss,
his Attys.

UNITED STATES PATENT OFFICE.

ARVID W. EKSTROM, OF LOS ANGELES, CALIFORNIA.

PROCESS OF MANUFACTURING BARIUM AND STRONTIUM COMPOUNDS.

1,067,595.  Specification of Letters Patent.  Patented July 15, 1913.

Application filed August 7, 1911. Serial No. 642,791.

*To all whom it may concern:*

Be it known that I, ARVID W. EKSTROM, a citizen of Sweden, residing at Los Angeles, in the county of Los Angeles and State of California, have invented new and useful Improvements in Processes of Manufacturing Barium and Strontium Compounds, of which the following is a specification.

This invention relates to improvements in the manufacture of barium and strontium compounds and the principal object of the invention is the production of barium and strontium compounds by a purely chemical process, using the native salts and in connection therewith, oil in a gaseous condition as a reducing agent. The process is adapted for use in connection with the native barium and strontium salts, it being the purpose to produce therefrom barium and strontium sulfid, carbonate, oxid, and hydroxid.

In order to illustrate the invention the method employed in the manufacturing of barium oxid or hydroxid from native barium sulfate ($BaSO_4$), (that is heavy spar or baryte,) will be set forth as an example of the improved process forming the subject matter of the said invention. The said process may be set forth with the following steps:

30  *A. Reduction of barium sulfate.*—The baryte or heavy spar is ground to a proper fineness, after which it is put into a closed vessel such as an earthenware muffle, where it is subjected to heat of a sufficiently high degree to cause low redness, (about 500° C.) The retort is then sealed so as to be air tight in any suitable manner. An oil spray is injected therein above the compounds so as to form oil-gas within the muffle, the gas passing slowly over the red hot mass of the baryte. The oil-gas, which contains hydro-carbons in differing proportions, acts as a reducer of the sulfate which is thus converted into a sulfid, while at the same time gases of carbon-dioxid, carbon monoxid and water, according to the circumstances, are evolved, and the gases escape through an outlet or opening and may be ignited underneath the vessel thus utilizing their calorific energy by a perfect combustion.

The reaction that takes place may be understood by the following chemical equations:

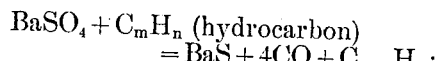
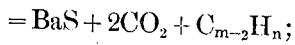

$$BaSO_4 + C_mH_n \text{ (hydrocarbon)}$$
$$= BaS + 4CO + C_{m-4}H_n;$$
or
$$= BaS + 2CO_2 + C_{m-2}H_n;$$
or
$$= BaS + 2CO + 2H_2O + C_{m-2}H_{n-4}.$$

The reduction of the baryte sulfate just described is best carried out in a furnace mechanism like that shown in the accompanying drawing and the process will be described with relation to the said drawing in order to more fully set forth the invention.

In the accompanying drawing forming a part of this specification, Figure 1 is a longitudinal vertical sectional view through a furnace such as is preferably employed in reducing the barium and strontium compounds. Fig. 2 is a transverse sectional view through the same, taken on the line 2—2 of Fig. 1. Fig. 3 is an enlarged detail sectional view through a portion of one of the walls of the furnace showing the ducts and passages for delivering the gas generated in the furnace to the burners thereof.

The details of the furnace mechanism will now be described, reference being had to said drawing in which 3 and 4 indicate muffles or retorts preferably formed of earthenware, and said muffles are mounted in a furnace structure 5 the walls thereof being made of any usual or suitable material. The muffles are located upon transverse grids 6 and 7 mounted in the furnace 5 in such a manner that spaces for the products of combustion may pass upwardly around and between the said muffles and thence outwardly through any suitable outlet flue or stack 8.

A space is left below the muffles to form a combustion chamber 9 into which a burner 10 or other heating means is extended through an aperture 11 in one of the walls of the furnace. The muffles are formed open at one end, the said open end projecting through the walls of the furnace 5 and being adapted to be tightly closed by doors 12 and 13.

When the muffles are to be closed the doors are put in place and are then tightly sealed. The door 12 of the upper muffle is provided with a spraying nozzle 14 of any desired type for introducing oil or other materials in sprayed form into said muffle. I have found it highly desirable in previous experiments to inject the oil sprayed from the nozzle above the charge, as the solid carbon residue which naturally settles on the same will become rapidly oxidized by the $BaSO_4$ and converted into a gaseous carbon monoxid and carbon dioxid, thus eliminating any danger of clogging the muffle. This method of spraying above the charge has also been found desirable in case a perforated tray is used, for, by spraying beneath the tray the perforations would quickly become clogged rendering the process inoperative in a short period. The said door 12 is also provided with an aperture 15 adapted to be closed by any slide or plate 16. The door affords a means for introducing rakes or other implements into the muffle for distributing and moving the materials therein treated. The lower door 13 is provided with a similar opening 17 adapted to be closed by a slide or plate 18 and affording access to the interior of the lower muffles.

The two muffles are connected by a vertical chute 19 which is made to extend almost the entire width of the muffles but may be narrower in cross section as shown in Fig. 1. The passage formed in said chute 19 is made with downwardly flaring walls so that the materials passing through the same cannot become clogged therein. The upper muffle is charged by means of a hopper 20 mounted upon the top of the furnace and communicating with the said muffle by means of a connecting passage 21 formed in the top of the furnace and an aperture 22 in the top wall of the muffle. A valve 23 adapted to fit in the outlet of the hopper and controlled by a hand lever 24 is employed to regulate the admission of material to be treated into the said upper muffle.

The chute 19 is located near the inner ends of the muffles so that the materials treated in the upper muffle may be pushed into the passage in said chute and allowed to fall into the lower muffle where it is again subjected to the hot gases evolved from the upper muffle. At a later period of the operation the material in the lower muffle is discharged through a similar downwardly flaring chute 25 formed in the wall of the furnace 5. The lower end of the said chute 25 communicates with a broad flat pipe or chute 26 so that the treated materials may be led from the lower muffle into a receptacle or tank 27 which normally contains water, the said pipe 26 extending into the water and below the surface thereof. The walls of the furnace are also provided with gas ducts 28 and 29 in the side walls thereof as clearly shown in Figs. 1 and 2, the said ducts communicating with the chute 25 by means of small passages 30 with slots 31 formed in the walls of the combustion chamber 9. There are preferably a number of said slots extending along each side wall of the combustion chamber, and the gases generated in treating the barium or strontium compounds will be conducted by the chute 25 and the ducts 28 to the said slots 31 where the gas escapes into the combustion chamber of the furnace and becomes ignited for heating the same.

Sliding valves 32 are mounted in passages 33 formed in the walls of the furnace 5 and adapted to control the gas passages 30. Operating handles 34 extend from said sliding valves to the exterior of the furnace.

The tank 27 is provided with a draw off pipe 35 controlled by a valve 36 and having a strainer 37 upon its inner end through which the materials deposited from the muffles and taken up in solution in said tank 27 may be withdrawn therefrom. A valve controlled pipe 38 also extends into the lower part of the said tank 27 for introducing steam thereto and maintaining water at a proper temperature.

In using the furnace the process is carried out in the following manner: The compounds to be treated are placed in the hopper 20 and suitable charges thereof are introduced into the upper muffle 6 by operating the valve 23. The materials are then spread out in a layer upon the bottom of the muffle to a thickness of say from three to four inches. The materials are reached through the door 15 so that they may be spread by rakes, hooks or other implements. After this is done the temperature in the furnace is raised to red heat so as to bring the materials to the point of reduction and the air of the muffles is expelled therefrom by means of any suitable steam jet. The oil is then introduced in the form of a spray from the nozzle 14 above the charge therein and usually under suitable pressure to form a finely divided spray. When the oil thus sprayed comes in contact with the heated charge or the walls of the muffle it will immediately be gasified and will tend to reduce the charge and then pass out through the chute 19 to the lower muffle 7 where it will further reduce a preceding charge which has been delivered into a second muffle beneath.

The charge is usually allowed to remain in the upper muffle 6 for about an hour, at the end of which time it is caused to drop through the chute 19 to the lower muffle 7 where it is again spread into a suitable layer by means of implements inserted through the door 17. A new charge is also introduced at this time into the upper muffle 6 as above described. In the lower muffle 7 the charge is allowed to remain about two hours at the end of which time it is discharged through the outlet chute 25 passing thence through the pipe 26 into the tank 27. During all this time oil is allowed to flow for treating the charge and forming the gas and when the openings 15 and 17 are uncovered to move or spread the charges of the muffles, the gases within having a slight pressure due to their generation, have a tendency to shoot out of said apertures thus preventing the air entirely from entering the muffles and coming in contact with the materials therein, which at the temperature maintained within the muffle is oxidized very easily. The charge in passing from the pipe 26 into the tank 27 is admitted thereto below the water level so that air cannot enter the ports of the furnace or the muffles for oxidizing any of the contents thereof. It will be noticed in this process that the oxidation due to the presence of air is fully guarded against from the time the materials enter the upper muffle until leaving the dissolving tank 27 as sulfid.

The upper muffle 6 serves for the complete gasification of the oil and also heating of the gas formed therein, for the preheating of the new charge, and partially for the reduction of the same. The lower muffle is adapted for the complete reduction of the charge which was previously treated in the upper muffle, it being found to be capable of reducing fully 95% of the charge. The lower muffle is arranged in the furnace described as closely to the source of heat as is compatible with an even distribution of the heat so that the temperature of the same is consequently somewhat higher than that of the upper muffle and thus facilitating the final reduction. Occasionally the charges are stirred by means of stirring hooks in order to facilitate the reaction.

The structure of the furnace is such that when the temperature has been raised to the proper degree the oil burner 10 may be gradually shut down and simultaneously more oil is introduced through the nozzle 14 and into the upper muffle 6 producing a greater quantity of combustible gases within the muffle.

When the process has progressed so that the temperature of the muffles has been raised to the proper degree the oil burner 10 may be entirely shut off and the oil sprayed from the nozzle 14 above the charge will supply a sufficient amount of oil to produce the gas necessary for the reduction of the charge and for the maintenance of the proper temperature in the furnace, the combustible gases from the muffles being burned as they escape from the opening 31 in the combustion chamber.

When the charge in the lower muffle has been treated for a suitable length of time, it is so raked as to fall in a red hot condition through the chute 25 and the pipe 26 into the water contained in the tank 27. The water in said tank is at the same time maintained at a temperature of about 80° centigrade by means of steam which is injected through the pipe 38 thereby aiding the dissolving of the sulfid, when the mass has thus been lixiviated, the solution, which, besides the sulfid produced by the treating of the charges, also contains some suspended matter consisting of unreduced sulfate and free carbon, (from the oil) is drawn off through the pipe 35 and conducted to any suitable apparatus for clarification.

In the clarifying apparatus the mechanically suspended impurities of the solution can be easily separated and dried for further use in the first step of the process and the sulfid solution may be conducted to any suitable apparatus for the carbonating of the barium sulfid.

It will be understood that in place of the oil spray delivered at the nozzle 14, an oil-steam-spray or oil-producer-gas or natural gas may be injected into the upper muffle for providing a reducing agent within the same without departing from the spirit of the invention.

The next step of the process is as follows:

B. *Carbonating of barium sulfid.*—The barium sulfid (BaS) obtained as described above is, when dissolved in hot water, hydrolyzed and converted into barium sulfhydrate [Ba(SH)$_2$] and barium hydroxid [Ba(OH)$_2$] the chemical reaction being:

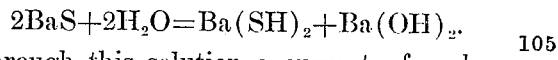

Through this solution a current of carbon dioxid (CO$_2$) is passed in order to desulfurize the same. The barium held in solution is thus precipitated as barium carbonate (BaCo$_3$) and the sulfur in the state of gaseous sulfureted hydrogen (H$_2$S) is expelled from the solution. The chemical reaction that takes place is as follows:

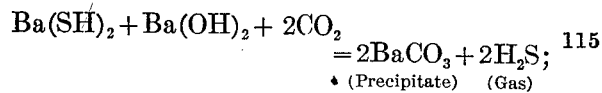

The operation may be carried out by the use of any desired form of apparatus, but is well conducted in a series of tanks arranged in the manner of Woulff's bottles so that the gas-inlet of one tank may be connected with the gas outlet of the next tank, thus forcing the gases to ascend from the bottom of the tanks through the solution to the top and thence to the next tank, and so on. In this way nearly all the carbon dioxid will be absorbed by the solution and converted into carbonate. When the percentage of alkalinity of the liquid has become decreased to about 0.3% it is preferable to discontinue the current of carbon dioxid as it is very difficult to convert the balance of the sulfid into carbonate. The tanks are usually so arranged that any of them may be disconnected from the system by means of valves.

During the carbonating process the solution should be kept at about 90° centigrade, this temperature being the most advantageous for the absorption of the carbon dioxid, and in order to maintain such a temperature a stream of steam may be injected into the solution. The carbonate rapidly settles on the bottom of the tank and after some time the solution is decanted and conducted to the lixiviation-tanks to be subsequently used for dissolving another quantity of sulfid, thereby avoiding the loss of any remaining uncarbonated sulfid in solution. After having carefully washed the carbonate with water, the liquid is discharged from the tank and the carbonate dried in any suitable apparatus.

The sulfureted hydrogen evolved through the reaction may be led off and treated in the usual manner for the removal of the obnoxious odors and for the recovery of the sulfur.

*C. Decarbonating of the barium carbonate.*—The barium carbonate ($BaCO_3$) thus obtained is put into the upper muffle of a furnace like that described in carrying out step A. It is preferable however in this instance to employ magnesia muffles as the barium oxid at red heat has a strongly corrosive effect on silicious or aluminous material. The operation should be carried out in exactly the same manner as described in step A for reducing the sulfate. The barium carbonate after having been heated to a red heat (or about 500° to 600° centigrade) is treated with oil sprayed into the muffle whereby the carbonate will be converted into barium oxid (BaO) and this product is then dissolved in water in the same manner described with respect to the sulfid, for obtaining barium hydroxid [$Ba(OH)_2$], the reaction that takes place in reducing the carbonate may be expressed in the following equations:

$$BaCO_3 + C_mH_n \text{ (hydrocarbon)} = BaO + 2CO + C_{m-1}H_n;$$

or $$BaCO_3 + C_mH_n \text{ (hydrocarbon)} = BaO + CO + H_2O + C_mH_{n-2}.$$

The reduction of barium carbonate is highly facilitated by an admixture of lime or chalk, a ratio by weight, of two parts of barium carbonate to one of lime being advantageously employed. A charge of this character will neither frit nor stick to the bottom of the muffle during the operation but instead will remain porous and thus very permeable to the reducing gases.

While the barium oxid easily dissolves in water forming hydroxid, the lime remains practically insoluble and after separation from the solution it may be dried and used over again.

It will be understood that strontium sulfid, carbonate, oxid, and hydroxid may be obtained from the native strontium compounds in the same manner, and by the same treatment as that above set forth in the treatment of barium.

What I claim is:—

The process of reducing barium and strontium compounds without previously mixing therewith carbonaceous materials, which consists in subjecting said compounds to heat in a suitable receptacle in the presence of hydrocarbon gases generated from oil injected therein above said compounds, air being excluded from said receptacle.

In witness that I claim the foregoing I have hereunto subscribed my name this 15th day of July, 1911.

ARVID W. EKSTROM.

Witnesses:
E. STADTMAN,
EARLE R. POLLARD.